(12) United States Patent
Khajeh et al.

(10) Patent No.: US 11,397,486 B2
(45) Date of Patent: Jul. 26, 2022

(54) ULTRASONIC FORCE DETECTION

(71) Applicant: Apple Inc., Cupertino, CA (US)

(72) Inventors: Ehsan Khajeh, Los Gatos, CA (US); George Ho Yin Mak, Santa Clara, CA (US); Marcus Yip, San Carlos, CA (US); Brian Michael King, Saratoga, CA (US); Aaron Scott Tucker, Redwood City, CA (US); Jason S. Griesbach, Sausalito, CA (US); Paul X. Wang, Fremont, CA (US); Alex Joseph Lehmann, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/997,899

(22) Filed: Aug. 19, 2020

(65) Prior Publication Data

US 2021/0064177 A1 Mar. 4, 2021

Related U.S. Application Data

(60) Provisional application No. 62/894,650, filed on Aug. 30, 2019.

(51) Int. Cl.
*G06F 3/043* (2006.01)
*G06F 3/041* (2006.01)

(52) U.S. Cl.
CPC ............ *G06F 3/0414* (2013.01); *G06F 3/043* (2013.01); *G06F 3/0416* (2013.01); *G06F 2203/04105* (2013.01)

(58) Field of Classification Search
CPC .................. G06F 3/043; G06F 3/0416; G06F 2203/04106; G06F 3/0436; G06F 3/0412; G06F 2203/04105; G06F 3/017; G06F 3/016; G06F 3/0488; G06F 3/042; G06F 3/0418; G06F 3/044; G06F 3/045
See application file for complete search history.

(56) References Cited

U.S. PATENT DOCUMENTS 4,545,386 A * 10/1985 Hetz .................... A61B 8/4281
600/462
5,423,332 A * 6/1995 Zirps ...................... A61B 5/103
600/587
6,126,607 A * 10/2000 Whitmore, III ..... A61B 8/4281
600/459

(Continued)

FOREIGN PATENT DOCUMENTS

EP 3366434 A1 8/2018

*Primary Examiner* — Olga V Merkoulova
(74) *Attorney, Agent, or Firm* — Kubota & Basol LLP

(57) ABSTRACT

Ultrasonic force detection systems and methods can be based on propagation of ultrasonic waves in a user's body (e.g., in a user's digit). An amount of force can be determined using time-of-flight (TOF) techniques of one or more ultrasonic waves propagating in the user's body. In some examples, an electronic device including a transducer can be coupled to a digit, and can transmit ultrasonic waves into the digit. As the wave propagates through the thickness of the digit, a reflection of at least a portion of the transmitted wave can occur due to the bone and/or due to reaching the opposite side of the digit (e.g., finger pad). One or more reflections can be measured to determine the amount of force.

20 Claims, 10 Drawing Sheets

(56) References Cited

U.S. PATENT DOCUMENTS

| | | | |
|---|---|---|---|
| 6,135,968 A * | 10/2000 | Braunstein | A61B 5/6826 |
| | | | 600/587 |
| 9,743,906 B2 | 8/2017 | Maeva et al. | |
| 10,235,551 B2 | 3/2019 | Lu et al. | |
| 10,296,145 B2 * | 5/2019 | Medina | G06F 3/0416 |
| 10,579,099 B2 * | 3/2020 | Wang | G06F 1/163 |
| 2010/0066697 A1 * | 3/2010 | Jacomet | G06K 9/0012 |
| | | | 345/173 |
| 2015/0366504 A1 * | 12/2015 | Connor | A61B 5/6804 |
| | | | 600/301 |
| 2015/0370320 A1 * | 12/2015 | Connor | A61B 5/1126 |
| | | | 345/173 |
| 2016/0054826 A1 * | 2/2016 | Huppi | G06F 3/043 |
| | | | 345/177 |
| 2016/0313798 A1 * | 10/2016 | Connor | A61B 5/0059 |
| 2017/0255338 A1 * | 9/2017 | Medina | G06F 3/0416 |
| 2019/0310713 A1 * | 10/2019 | Wang | G06F 3/039 |

* cited by examiner

ULTRASONIC FORCE DETECTION

CROSS REFERENCE TO RELATED APPLICATIONS

This application claims the benefit under 35 USC 119(e) of U.S. Provisional Patent Application No. 62/894,650, filed Aug. 30, 2019, the contents of which are incorporated herein by reference in their entirety for all purposes.

FIELD OF THE DISCLOSURE

This relates generally to force detection systems, and more particularly, to ultrasonic force detection systems and methods based on propagation of ultrasonic waves in a user's body.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. Capacitive-type touch sensing systems, however, can experience reduced performance due to conductive, electrically-floating objects (e.g., water droplets) in contact with the touch-sensitive surface.

In some examples, as described herein, a wearable input device can be used to detect force applied by a body part to a surface that may or may not be touch sensitive.

SUMMARY

This relates to ultrasonic force detection systems and methods based on propagation of ultrasonic waves in a user's body (e.g., in a user's digit). An amount of force can be determined using time-of-flight (TOF) techniques of one or more ultrasonic waves propagating in the user's body. In some examples, an electronic device including a transducer (e.g., a piezoelectric transducer) can be coupled to a digit (e.g., a finger), and can transmit ultrasonic waves into the digit. As the wave propagates through the thickness of the digit, a reflection of at least a portion of the transmitted wave can occur due to the bone and/or due to reaching the opposite side of the finger (e.g., finger pad). One or more reflections can be measured to determine the amount of force. In some examples, the amount of force can be determined based on the amount of time (or a change in the amount of time compared with a zero-force baseline) elapsing between the transmission of the wave and the detection of one or more reflected wave. In some examples, the amount of force can be determined based on a distance between the transducer and the bone (or a change in the distance compared with a zero-force baseline). Ultrasonic force detection can be used independent of, or in conjunction with, other touch sensing techniques, such as resistive, optical, ultrasonic and/or capacitive touch sensing.

DETAILED DESCRIPTION

Figure 1A:
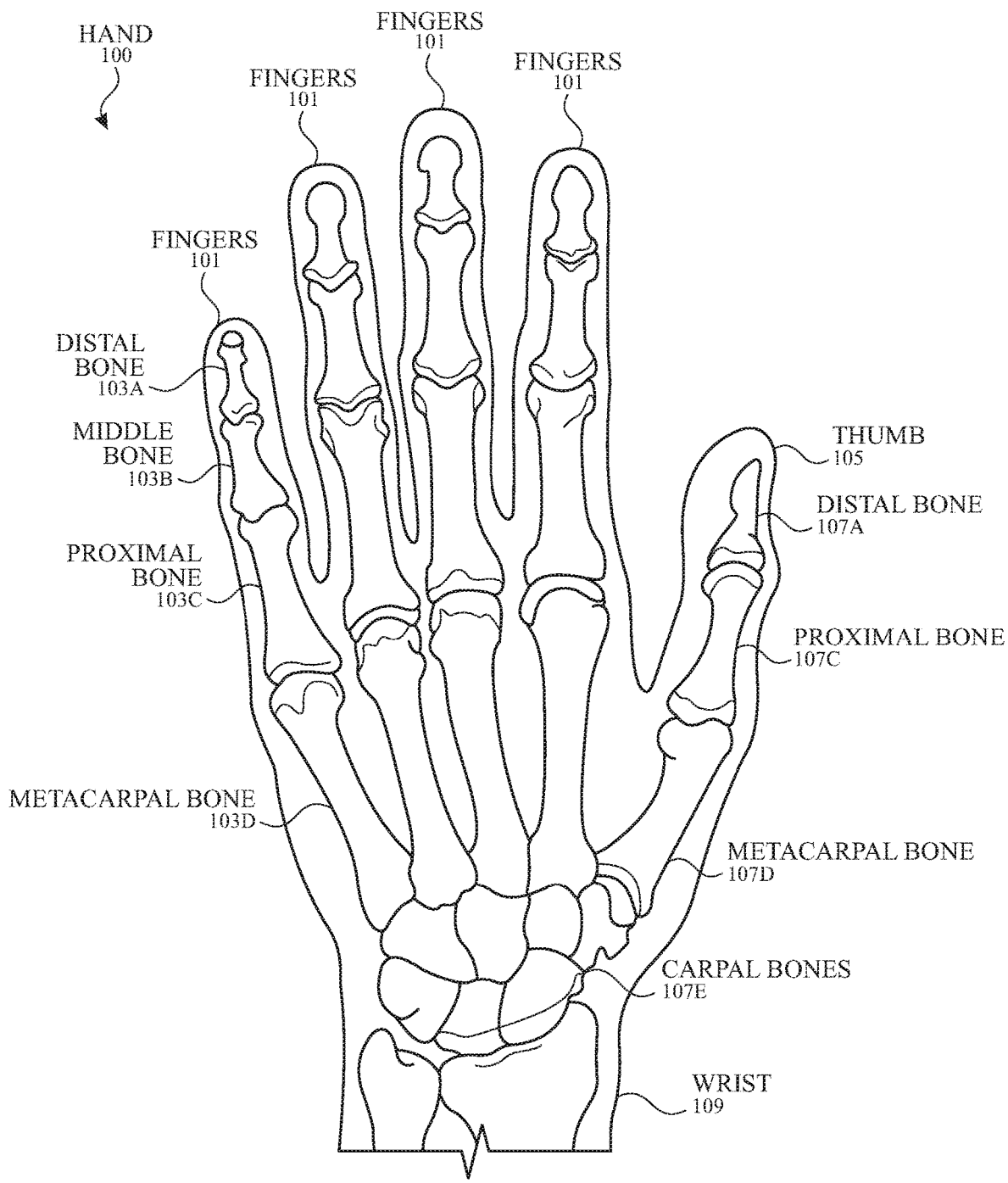
FIG. 1A illustrates an exemplary model of a human hand according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

This relates to ultrasonic force detection systems and methods based on propagation of ultrasonic waves in a user's body (e.g., in a user's digit). An amount of force can be determined using time-of-flight (TOF) techniques of one or more ultrasonic waves propagating in the user's body. In some examples, an electronic device including a transducer (e.g., a piezoelectric transducer) can be coupled to a digit (e.g., a finger), and can transmit ultrasonic waves into the digit. As the wave propagates through the thickness of the digit, a reflection of at least a portion of the transmitted wave can occur due to the bone and/or due to reaching the opposite side of the finger (e.g., finger pad). One or more reflections can be measured to determine the amount of force. In some examples, the amount of force can be determined based on the amount of time (or a change in the amount of time compared with a zero-force baseline) elapsing between the transmission of the wave and the detection of one or more reflected wave. In some examples, the amount of force can be determined based on a distance between the transducer and the bone (or a change in the distance compared with a zero-force baseline). Ultrasonic force detection can be used independent of, or in conjunction with, other touch sensing techniques, such as resistive, optical, ultrasonic and/or capacitive touch sensing.

It is understood that the sensitivity of the force measurement may depend on the information available about the mechanical properties of the digit. In some examples, determining the amount of force described herein may refer to measuring a quantity proportional to the amount of applied force (e.g., with relatively low sensitivity that may not accurately measure the applied force). Measuring such a quantity can be used to provide information about whether a digit is in contact with a surface or not (e.g., contact/non-contact status) or provide information about a minimum amount of force indicative of a force/press input. For example, when the quantity that is proportional to the amount of applied force indicates an applied force above a threshold, the system can determine contact between a digit and a surface (or a force/press input). When the quantity that is proportional to the amount of applied force indicates an applied force below the threshold, the system can determine that the digit is not contacting the surface (or not providing a force/press input). Such contact/non-contact status may be useful to differentiate between proximity of a digit to a surface and contact of a digit and the surface (e.g., when using an image sensor or camera to detect position/contact of the digit) and/or to detect force/press inputs. In some examples, as described herein, the amount of force can be measured more precisely (e.g., with relatively high sensitivity that may accurately measure the applied force or at least provide a more sensitive force detection than simply contact/non-contact status). For example, mechanical properties of the digit/tissue may be known (or estimated using empirical data or calibration, for example), such that TOF readings can be more accurately translated to an amount of force.

FIG. 1A illustrates an exemplary model of a human hand according to examples of the disclosure. The human hand 100 can have multiple degrees of freedom. For example, each of the four fingers 101 can have four degrees of freedom due to joints located between the distal bone 103A, the middle bone 103B, and the proximal bone 103C that can allow for flexion or extension. Each of the four fingers 101 also has a joint associated with the metacarpal bone 103D that can allow for abduction or adduction. The thumb 105 can have five degrees of freedom due to a joint located between the distal bone 107A and the proximal bone 107C that can allow for flexion or extension. A joint located between the proximal bone 107C and the metacarpal bone 107D on the thumb 105 can allow for flexion (or extension) and abduction (or adduction). Additionally, a joint located between the metacarpal bone 107D on the thumb 105 and the carpal bones 107E can allow for flexion (or extension) and abduction (or adduction). Furthermore, the wrist 109 can have six degrees of freedom, where the user's wrist movement can include flexion or extension, abduction or adduction, and supination or pronation. In some examples, the motion of fingers 101 and or other movements of a user's hand can be tracked (e.g., optically or using inertial measurement sensors), and the tracked movements can be used as inputs. For example, the tracked inputs can be used as inputs for interactions with virtual reality (VR), augmented reality (AR) and or projected displays (on non-touch sensitive surfaces). In addition, these track inputs can be used in conjunction with touch sensitive or non-touch sensitive displays.

In addition to motion of the fingers or hand, one or more force sensors and associated force detection circuitry can be disposed proximate to distal bones 103A of one or more fingers 101 and/or thumb 105 to measure the force applied by the user's fingers (or more generally any body parts or digits) on a surface. A force sensor can be any suitable force sensor including resistive, capacitive and/or piezoelectric strain gauge sensors measuring a force applied to the force sensor disposed at or near a finger pad corresponding to distal bones 103A. For example, a resistive force sensor can detect changes in resistance of a bendable member (e.g., strain gauge structure) disposed between the finger pad and a surface when the bendable member bends in response to the applied force between the finger and the surface. A piezoelectric force sensor can detect a current or voltage generated due to compression of the piezoelectric material disposed between the finger pad and a surface due to the amount of force applied between the finger and the surface. A capacitive force sensor can detect a change in capacitance between two electrodes (e.g., due to a change in distance therebetween) disposed between the finger pad and a surface due to the amount of force applied between the finger and the surface.

The force measured by the force sensor can be used to detect a force input. For example, a force sensor can indicate a press of a physical surface corresponding to a virtual object (e.g., a button or key) in an AR, VR or projected display to perform an action associated with the virtual object. In some examples, a force sensor can indicate a press between two fingers (e.g., between index finger and thumb) for use as a selection input (e.g., in an AR, VR, projected display, or any other system accepting a selection input). In some examples, the amount of force can used to provide different types of inputs depending on the amount of force (e.g., to distinguish between light and hard presses). It should be understood that the amount of force and/or a press input (exceeding a threshold) can be used to perform different actions.

In some examples, as described in more detail herein, a force sensor can be implemented without obstructing the finger pad. As a result, the finger pad can be used for other inputs (e.g., capacitive touch inputs) or other activities (e.g., more natural contact with surfaces, etc.). For example, as an ultrasonic force detection system can be implemented on a top surface of a finger, opposite the finger pad, and can detect force applied at the finger pad without obstructing the finger pad.

Figure 1B:
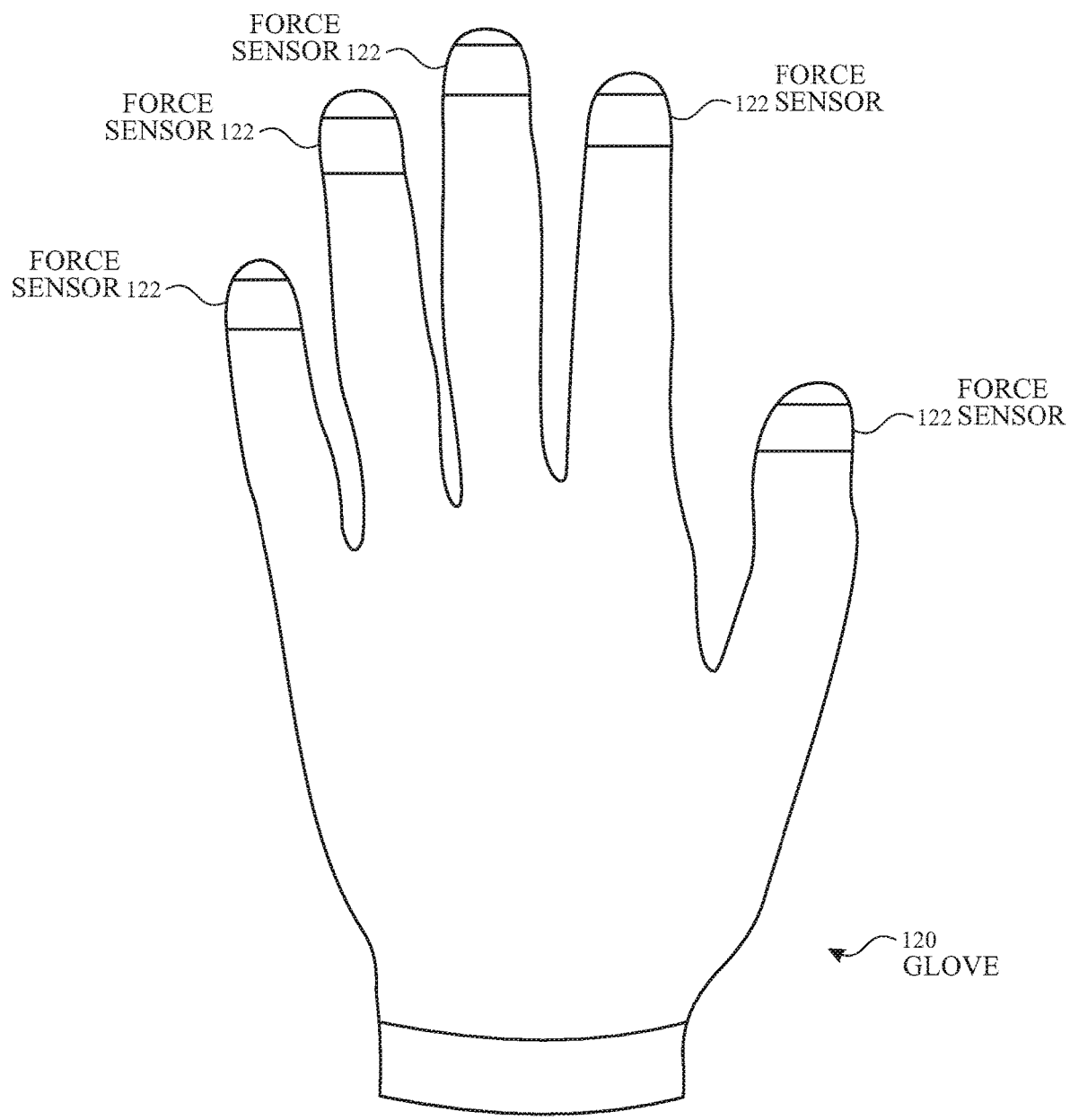
FIGS. 1B and 1C illustrate exemplary systems with an ultrasonic force detection system for detecting an applied force between a finger and a surface according to examples of the disclosure.
Figure 1C:
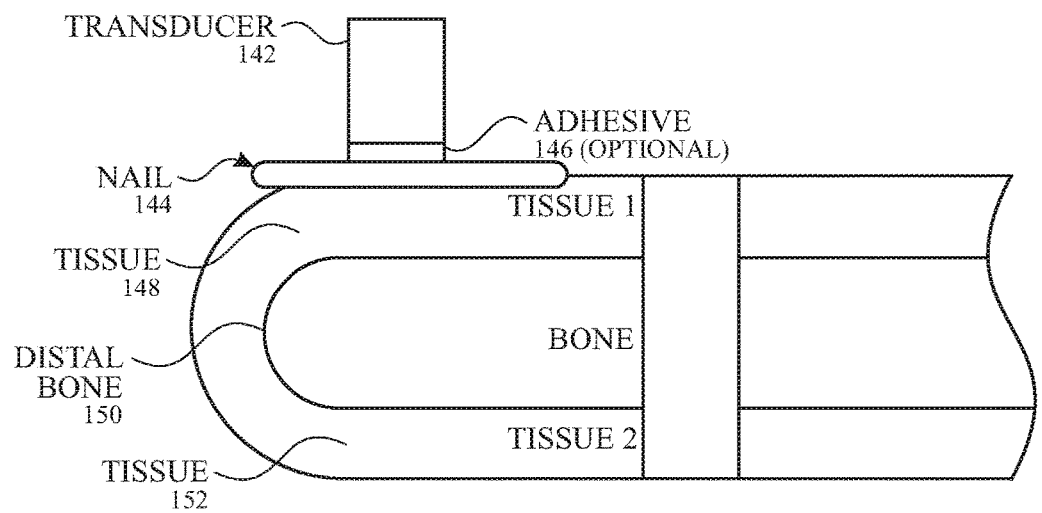

FIGS. 1B and 1C illustrate exemplary systems with an ultrasonic force detection system for detecting an applied force between a finger and a surface according to examples of the disclosure. FIG. 1B illustrates an example glove 120 that can include an ultrasonic force detection system according to examples of the disclosure. As illustrated in FIG. 1B each finger includes a force sensor 122 including associated circuitry for detecting force applied by the distal bone of a finger. In some examples, glove 120 may include a force sensor for a subset of fingers (e.g., the index finger and/or the thumb). Although FIG. 1B illustrates a glove 120, in some examples, the ultrasonic force detection system can be implemented in other devices. For example, an ultrasonic force detection system can be implemented in a finger cap or finger sleeve, in a ring, in another form of finger worn device (coupled to a finger via a strap, clamp or any other suitable fastener), or can be coupled directly to the finger (e.g., with a temporary adhesive). FIG. 1C illustrates an example finger 140 with an example transducer 142 coupled to nail 144 of the finger with an adhesive (e.g., a pressure sensitive adhesive). In some examples, transducer 142 can be coupled to nail 144 without using an adhesive (e.g., with a strap or other fastener). For example, transducer 142 can be part of force sensor 122 illustrated in FIG. 1B. As described herein the transducer and associated circuitry can be used to detect a force applied due to contact between the opposite side of finger 140 (e.g., finger pad of finger 140) and a surface. In some examples, changes in the overall thickness of finger 140 (e.g., across first tissue layer 148, distal bone 150 and second tissue layer 152) can be used to determine the applied force. In some examples, changes in the thickness of a portion of finger 140 (e.g., across first tissue layer 148) can be used to determine the applied force.

Figure 6A:
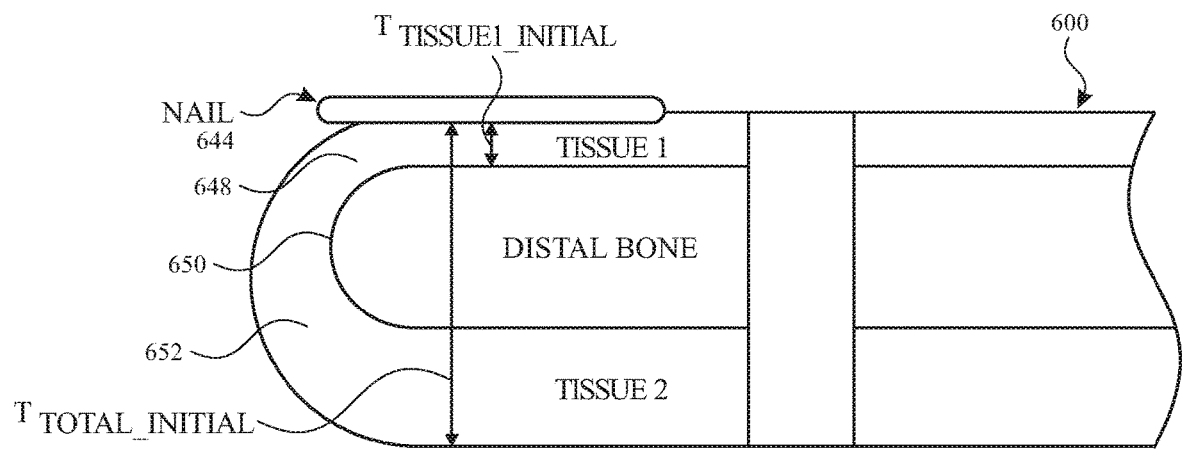
FIGS. 6A-6B illustrate an example finger with an applied force of zero and with a non-zero applied force according to examples of the disclosure.
Figure 6B:
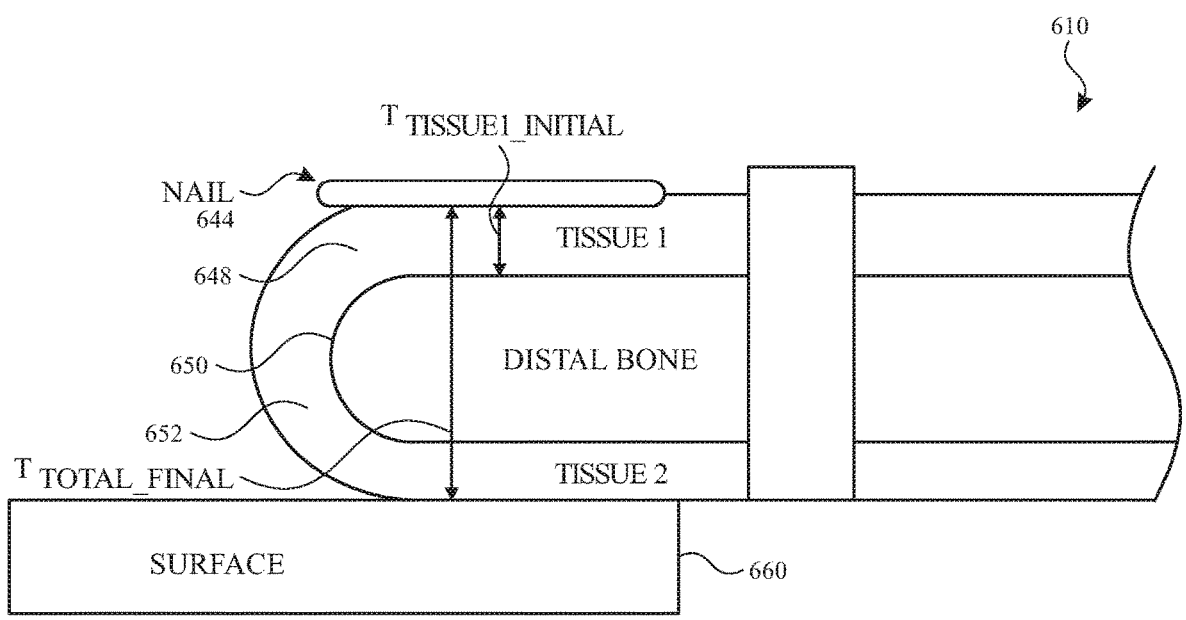

FIGS. 6A-6B illustrate an example finger with an applied force of zero and with a non-zero applied force according to examples of the disclosure. FIG. 6A illustrates a finger including distal bone 650 (e.g., corresponding to distal bone 103A, 150), first tissue layer 648 (e.g., corresponding to tissue 148) between distal bone 650 and nail 644, and second tissue layer 652 (e.g., corresponding to tissue 152) between distal bone 650 and the finger pad. FIG. 6A can correspond to a zero-force condition with the finger in free-space (not pressing on a surface). As shown in FIG. 6A, a first distance across first tissue layer 648 between nail 644 and distal bone 650 (thickness of the first tissue layer) can be defined (labeled "$T_{Tissue1\_initial}$" in FIG. 6A for initial thickness of first tissue layer) and can reference the baseline distance across (or thickness of) first tissue layer 648 without an applied force. A second distance across (thickness of) the entire finger (including first tissue layer 648, second tissue layer 652 and distal bone 650) can be defined ("$T_{Total\_initial}$" in FIG. 6A for initial thickness of total finger) and can reference the baseline distance (thickness) of the finger without an applied force.

FIG. 6B illustrates the finger including distal bone 650, first tissue layer 648, and second tissue layer corresponding to the finger pressing on surface 660 (e.g., a table, an object, a display or touch screen, another finger, etc.). As shown in FIG. 6B, a first distance across first tissue layer 648 (e.g., between nail 644 and distal bone 650) can be defined ("$T_{Tissue1\_final}$"), and a second distance across the entire finger can be defined ("$T_{Total\_final}$"). Compared with the baseline distances of FIG. 6A, the distances of FIG. 6B can change with the application of force. The first distance across first tissue layer 648 can increase with respect to the baseline distance across first tissue layer 648. The second, total distance across the entire finger can decrease with respect the baseline distance across the entire finger. The amount of change in the first distance with respect to the baseline can be expressed mathematically by $T_{Tissue1\_final} - T_{Tissue1\_initial}$, and the amount of change in the second distance with respect to the baseline can be expressed mathematically by $T_{Total\_final} - T_{Total\_initial}$.

The amount of change in the first and/or second distances with respect to the baseline (or first and/or second distances themselves) can be used to determine the amount of applied force. Notably, applied force can be proportional to the change in the first distance. The applied force can increase with an increase in the first distance across first tissue layer 648 and the applied force can decrease with a decrease in the first distance across first tissue layer 648. Additionally, the applied force can be inversely proportional to the second distance across the finger (e.g., applied force increases as the second distance decreases, and the applied force decreases as the second distance increases). As explained in more detail below, one or both of these proportionality relationships can be used for force detection.

In some examples, distances or changes in the distances can be detected using ultrasonic force detection techniques (e.g., using ultrasonic force sensor 122). For example, as described herein, the distances (or changes in distances) can be estimated based on time-of-flight (or changes in time-of-flight) of ultrasonic energy propagating in the finger. In some examples, rather than estimating the distances (or changes in distances), the time-of-flight (or changes in the time of flight) can be used to detect applied force as the relationship between time-of-flight and distance can also be proportional.

Figure 2:
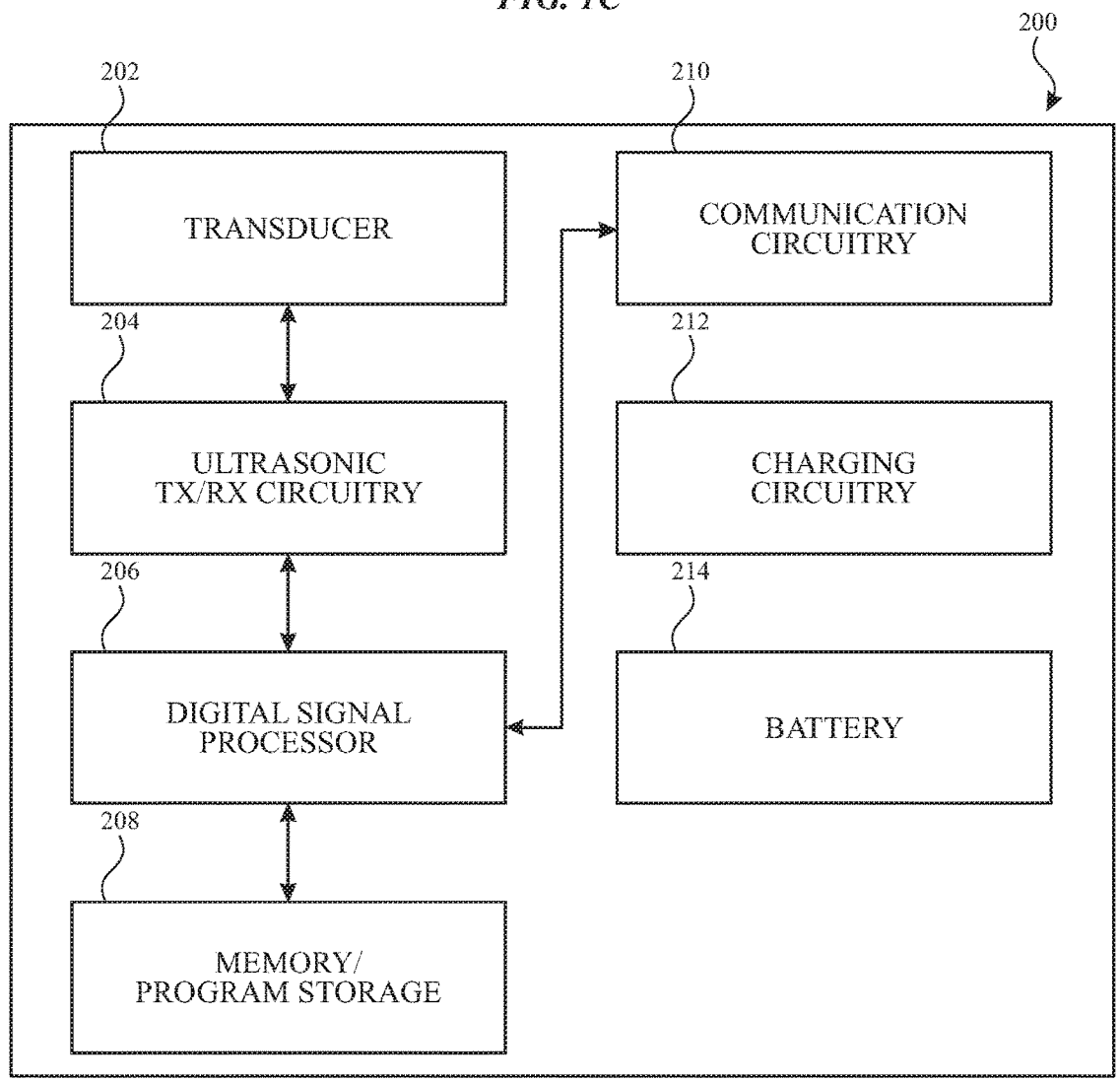
FIG. 2 illustrates an exemplary block diagram of an electronic device including an ultrasonic force detection system according to examples of the disclosure.

FIG. 2 illustrates an exemplary block diagram of an electronic device 200 including an ultrasonic force detection system according to examples of the disclosure. The electronic device can include an ultrasonic transducer 202, one or more integrated circuits (e.g., an ultrasonic transmitter/receiver (Tx/Rx) chip 204) configured to stimulate and sense transducer 202, and one or more digital signal processors (e.g., digital signal processor (DSP) 206) programmed to process the signals received from the transducer 202 via the one or more integrated circuits (e.g., ultrasonic Tx/Rx chip 204). In addition, electronic device 200 can, in some examples, include program storage and/or memory 208 to store instructions for digital signal processor 206 and/or to store the data/signals received from transducer 202. In some examples, electronic device 200 can also include communication circuitry 210 to communicate force information to a host processor (e.g., a computing device such as a mobile phone, media player, laptop or desktop computer, wearable device, tablet computer, or any other portable or non-portable computing device. Communication circuitry 210 can be a wired (e.g., a communication bus) or wireless (e.g., Bluetooth, WiFi, etc.) communication channel. In some examples, electronic device 200 can also include a power supply. For example, the circuitry of electronic device 200 can, in some examples, be powered by a wired power supply or by battery 214, which may be charged by charging circuitry 212 (e.g., via wired or wireless charging).

The components of electronic device 200 can be implemented on a single substrate, in some examples. In some examples, the transducer 202 can be bonded to the substrate by a bonding agent (e.g., a thin layer of stiff epoxy). In some examples, the transducer 202 can be deposited on one or more surfaces of the substrate through processes such as deposition, lithography, or the like. In some examples, transducer 202 can be bonded to the one or more surfaces using electrically conductive or non-conductive bonding materials. Although a single transducer 202 is illustrated in FIG. 2, it should be understood that an ultrasonic touch detection system can include more than one transducer (e.g., to sense force and more than one finger or to take more than one force measurement at the same finger). The additional transducers may use separate supporting circuitry (e.g., ultrasonic Tx/Rx chip 204, DSP 206, etc.) or may share some or all of the supporting circuitry. For ease of description, the description that follows may describe one transducer, but it is understood that multiple transducers may be used as well.

In some examples, transducer 202 can be a piezoelectric transducer, which can be made to vibrate by the application of electrical signals (e.g., by the Tx circuitry of ultrasonic Tx/Rx chip 204) when acting as a transmitter, and generate electrical signals (e.g., at the Rx circuitry of ultrasonic Tx/Rx chip 204) based on detected vibrations when acting as a receiver. In some examples, transducer 202 can be formed from a piezoelectric ceramic material (e.g., PZT or KNN) or a piezoelectric plastic material (e.g., PVDF or PLLA) or other suitable materials. Transducer 202 can be coupled to a finger (or more generally a digit or other body part). When electrical energy is applied to transducer 202 it can cause the transducers to vibrate, the surface (top) of the finger in contact with the transducers can also be caused to vibrate, and the vibrations of the finger (e.g., starting at the nail) can propagate as an ultrasonic wave through the one or more materials (e.g., tissue, bone, etc.) forming the finger. In some examples, vibration of transducer 202 can be used to produce ultrasonic waves at a selected frequency over a broad frequency range (e.g., 500 kHz-20 MHz) in the finger. It should be understood that other frequencies outside of the example range above can be used while remaining within the scope of the present disclosure.

Ultrasonic Tx/Rx chip 204 can include circuitry for driving electrical signals to stimulate vibration of transducer 202 (e.g., transmit circuitry), as well as circuitry for sensing electrical signals output by transducers 202 when the transducer is stimulated by received ultrasonic energy (e.g., receive circuitry). In some examples, timing operations for ultrasonic Tx/Rx chip 204 can optionally be provided by a separate controller (not shown) that can control timing of and other operations by ultrasonic Tx/Rx chip 204. In some examples, the controller can be coupled between ultrasonic Tx/Rx chip 204 and DSP 206. In some examples, controller functions can be integrated with ultrasonic Tx/Rx chip 204 (e.g., on a single integrated circuit). Signals (output data) from ultrasonic Tx/Rx chip 204 can be transferred to DSP 206 for further processing to determine an applied force by the finger contacting a surface, as will be described in more detail below. In some examples, the processing for determining the applied force and/or for determining a qualifying force event (e.g., a press input that exceeds a force threshold) can be performed by DSP 206.

DSP 206 can provide, via communication circuit 210, information to a computing device including a host processor. The host processor can receive ultrasonic force outputs from DSP 206 and/or other outputs (e.g., tracked motion or capacitive touch inputs) and perform actions based on the force outputs and/or other outputs. The host processor can, for example, communicate with a display driver to generate an image for display (e.g., on a touch screen, non-touch sensitive touch screen, or other projected display), such as an image of a user interface (UI), and can use tracked motion, touch inputs and/or ultrasonic force information from DSP 206 to detect inputs to the displayed UI. The touch input and/or force input can be used by computer programs stored in program storage of the computing device to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Note that one or more of the functions described herein (e.g., for ultrasonic force detection) can be performed by firmware or programs stored in memory and/or program storage 208 and executed by ultrasonic Tx/Rx chip 204 and/or DSP 206. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that electronic device 200 is not limited to the components and configuration of FIG. 2, but can include other or additional components in multiple configurations according to various examples. Additionally, the components of electronic device 200 can be included within a single device or can be distributed between multiple devices. Additionally, it should be understood that the connections between the components is exemplary and different unidirectional or bidirectional connections can be included between the components depending on the implementation, irrespective of the arrows shown in the configuration of FIG. 2.

Figure 3:
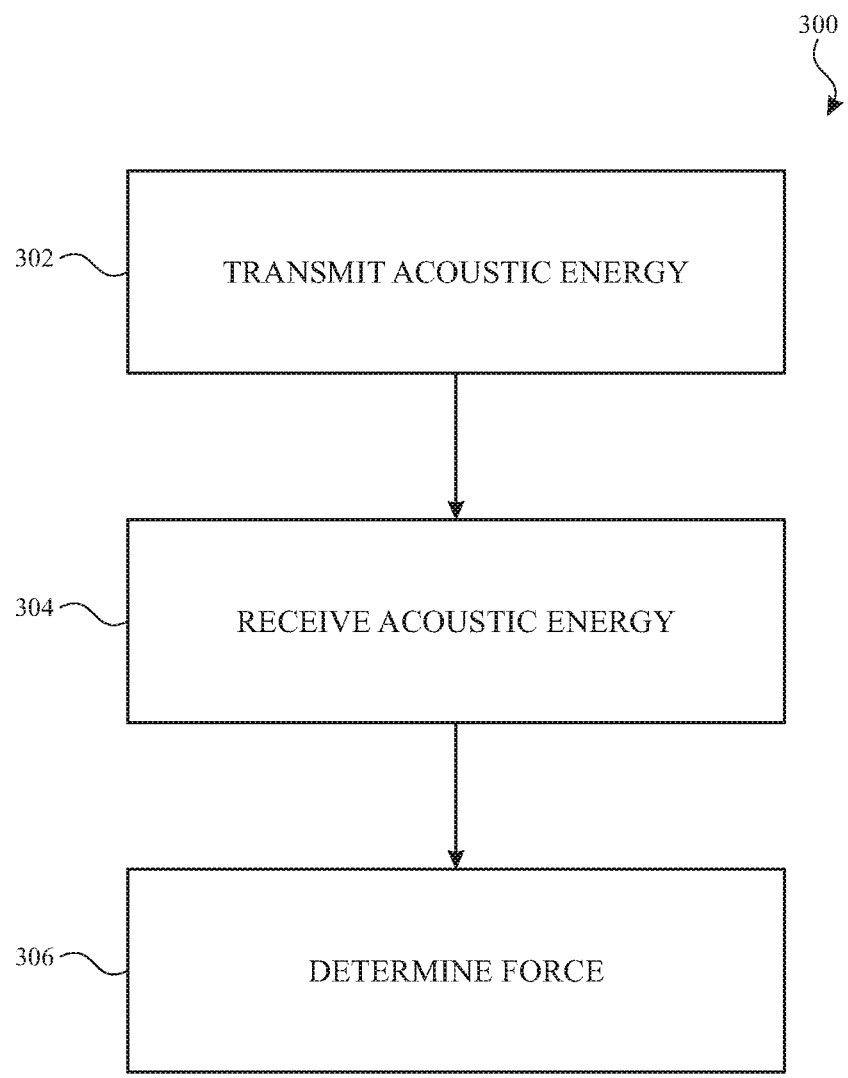
FIG. 3 illustrates an exemplary process for ultrasonic force detection at a finger according to examples of the disclosure.

FIG. 3 illustrates an exemplary process 300 for ultrasonic force detection at a finger (digit) according to examples of the disclosure. At 302, ultrasonic energy can be transmitted (e.g., by transducer 142, 202) through some or all of the thickness of a finger in the form of an ultrasonic wave, for example. In some examples, the wave can propagate as a compressive wave, a guided wave such as a shear horizontal wave, a Rayleigh wave, a Lamb wave, a Love wave, a Stoneley wave, or a surface acoustic wave. Other propagation modes for the transmitted ultrasonic energy can also exist based on the properties of the finger materials (nail, tissue, bone, etc.), geometry and the manner of energy transmission from the transducer to the surface of the finger. Transmitted energy can propagate through the thickness of the finger (e.g., tissue 148) until a discontinuity in the finger is reached (e.g., a distal bone 150), which can cause a portion of the energy to reflect. In some examples, a discontinuity can occur at opposite surface of the finger (e.g., when the ultrasonic wave propagates through tissue 152 to the surface (finger pad) opposite the transducer). When the transmitted energy reaches one of the discontinuities described above, some of the energy can be reflected, and a portion of the reflected energy can be directed to the transducer (e.g., transducer 142, 202).

At 304, returning ultrasonic energy can be received, and the ultrasonic energy can be converted to an electrical signal by the transducer (e.g., transducer 142, 202).

At 306, the ultrasonic force detection system can determine an applied force of the finger in contact with a surface based on the received ultrasonic energy. In some examples, a time-of-flight between transmission and reception of reflected energy can be measured and/or a corresponding distance (corresponding to a thickness of a portion or all of the finger) can be determined. For example, the distance can be determined from the measured time-of-flight and a propagation rate of the ultrasonic wave through the material(s) (e.g., with the distance being equal to half of the product of the rate and time-of-flight). The measured time-of-flight and/or determined distance can be used to determine the applied force. In some examples, changes in the thickness of a portion of or all of the finger from a baseline thickness (with zero applied force) or changes in the time-of-flight through portions or all of the finger can be used to determine an amount of applied force, as described in more detail below.

Although process 300, as described above, generally refers to reflected waves received by the same transducer(s) that transmitted the waves, in some examples, the transmitter and receiver functions can be separated such that the transmission of ultrasonic energy at 302 and receiving ultrasonic energy at 304 may occur at different co-located transducers (e.g., one transducer in a transmit configuration and one transducer in a receive configuration). Exemplary device configurations and measurement timing examples that can be used to implement process 300 will be described in further detail below.

Figure 4:
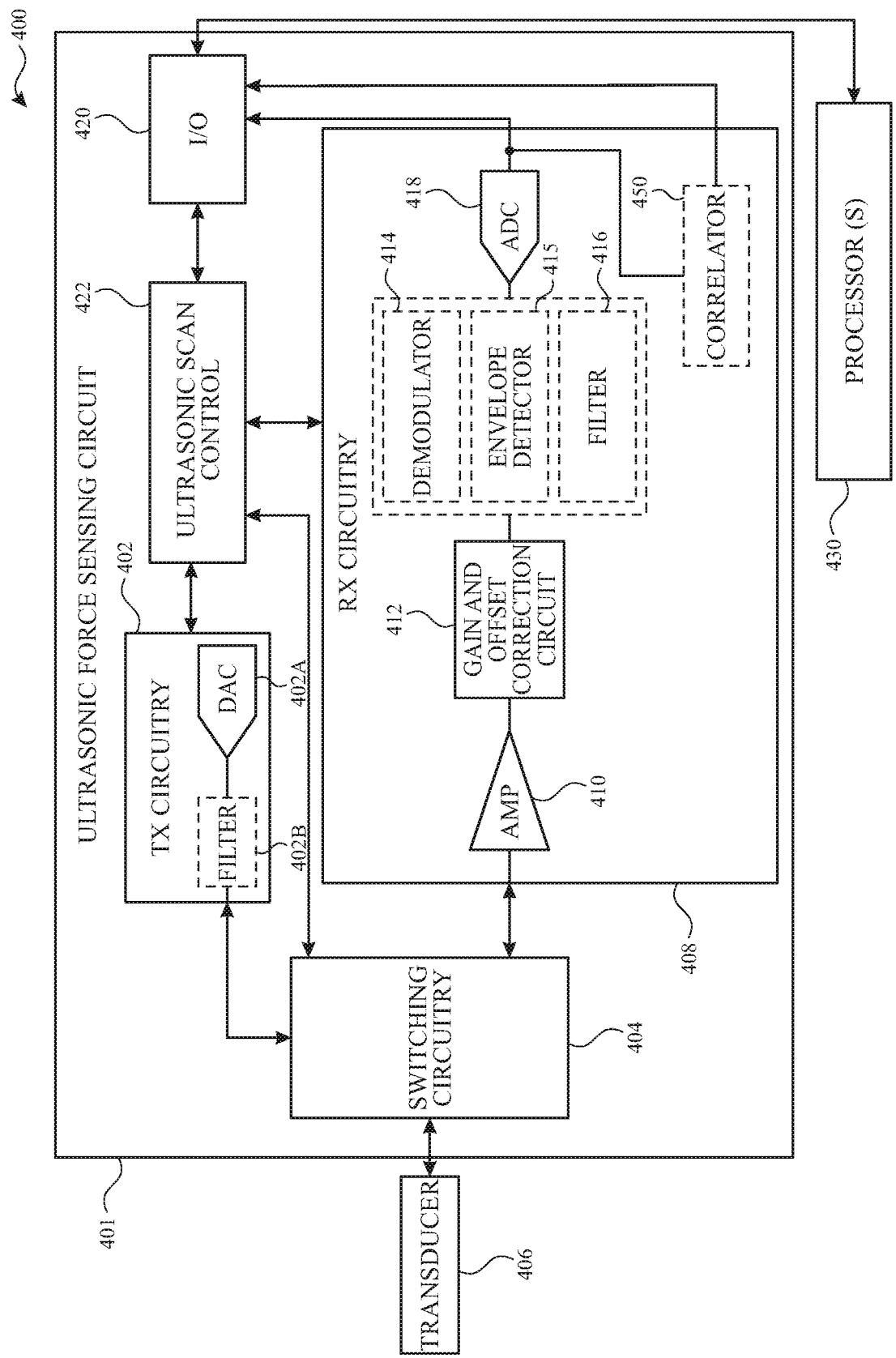
FIG. 4 illustrates an exemplary configuration of an ultrasonic force detection system including an ultrasonic force detection circuit, a transducer and one or more processors according to examples of the disclosure

FIG. 4 illustrates an exemplary configuration of an ultrasonic force detection system 400 including an ultrasonic force detection circuit 401, a transducer 406 and one or more processors 430 according to examples of the disclosure. Ultrasonic force detection circuit 401 (e.g., corresponding to ultrasonic Tx/Rx chip 204) can include transmit circuitry (also referred to herein as Tx circuitry or transmitter) 402, switching circuitry 404, receive circuitry (also referred to herein as Rx circuitry or receiver) 408, an input/output (I/O) circuit 420, and ultrasonic scan control logic 422. Transmitter 402, switching circuitry 404, receiver 408, I/O circuit 420 and/or ultrasonic scan control logic 422 can be implemented in an application specific integrated circuit (ASIC), in some examples. In some examples, transducer 406 (e.g. corresponding to transducer 202) can be included in ultrasonic force detection circuit 401

In some examples, a transmitter 402 can generate an electrical signal for stimulating movement of transducer 406. In some examples, the transmitted signal can be a differential signal, and in some examples, the transmitted signal can be a single-ended signal. In some examples, transmitter 402 can be a simple buffer, and the transmitted signal can be a pulse (or burst of pulses at a particular frequency). In some examples, transmitter 402 can include a digital-to-analog converter (DAC) 402A and an optional filter 402B that can be optionally used to smooth a quantized output of DAC 402A. In some examples, characteristics of the transducer itself can provide a filtering property and filter 402B can be omitted. DAC 402A can be used to generate transmit waveform (e.g., any transmit waveform suitable for the force detection operations discussed herein). In some examples, the transmit waveform output can be pre-distorted to equalize the channel. In some examples, the characteristics of the channel, such as the properties of the finger coupled to transducer 406, the discontinuities in the finger, and the reflection characteristics of an edge of the bone and/or opposite edge of the finger can be measured and stored. In some examples, the channel characteristics can be measured as a manufacturing step (or factory calibration step), and in other examples the characteristics can be measured as a periodic calibration step (e.g., each time the device is placed into contact with the finger, once a month, once a year, etc. depending on how quickly the channel characteristics are expected to change). In some examples, the channel characteristics can be converted to a transfer function of the channel, and the transmit waveform can be configured using the inverse of the channel transfer function such that the returning signal is equalized (e.g., returning signal can be detected as a pulse or a burst of pulses despite the transmitted waveform having a seemingly arbitrary waveform). In some examples, a single differential pulse can be used as a transmit waveform. For example, a bipolar square pulse (where the voltage applied to the transducer can be both positive and negative) can be used as the transmit waveform, and the bipolar square pulse can be implemented using a single-ended or differential implementation. In some examples, an energy recovery architecture can be used to recover some of the energy required for charging and discharging the transducer.

Switching circuitry 404 (e.g., one or more switches) can optionally be included to switch transducer 406 between transmitter 402 and receiver 408. In some examples, the switching circuitry can be omitted and the transducer 406 can be coupled to transmitter 402 and receiver 408. In some examples, multiple transducers can be used and switching circuitry 404 can include multiplexers (MUXs) and/or demultiplexers (DEMUXs) that can be used to selectively couple transmitter 402 and/or receiver 408 to one of the transducers 406 that can be the active transducer for a particular measurement step. In a differential implementation, switching circuitry 404 can include two MUXs and two DEMUXs. In some examples, a DEMUX can have a ground connection, and the non-selected DEMUX outputs can be shorted, open, or grounded. In some examples, the same transducer 406 can be coupled to transmitter 402 by switching circuitry 404 (e.g., DEMUXs) during the drive mode and coupled to receiver 408 by switching circuitry 404 (e.g., MUXs) during the receive mode. Thus, in some examples, a single transducer 406 can be used both for transmitting and receiving ultrasonic energy. In some examples, a first transducer can be coupled to transmitter 402 by switching circuitry 404 (e.g. DEMUXs) and a second transducer can be coupled by switching circuitry 404 (e.g., MUXs) to receiver 408. For example, the transmitting transducer and the receiving transducer can be discrete piezoelectric elements, where the transmitting transducer can be designed for being driven by higher voltages (or currents) to produce sufficient motion in transducer 406 to generate an ultrasonic wave in the surface of a device (e.g., device 200 above), and the receiving transducer can be designed for receiving smaller amplitude reflected energy. In such a configuration, the transmit-side circuitry (e.g., transmitter 402 and DEMUXs of switching circuitry 404) can be optionally implemented on a high voltage circuit, and the receive-side circuitry (e.g., receiver 408 and MUXs of switching circuitry 404) can be optionally implemented on a separate low voltage circuit. In some examples, switching circuitry 404 (MUXs and DEMUXs) can also be implemented on the high voltage circuit to properly isolate the remaining receive-side circuitry (e.g., receiver 408) during transmission operations by transmit side circuitry. Additionally or alternatively, in some examples, the transmit circuit can include an energy recovery architecture that can be used to recover some of the energy required for charging and discharging the transducer. It should be understood that for a single-ended implementation, switching circuitry 404 can include a single DEMUX and MUX. In such a configuration, transmitter 402 and receiver 408 can be single-ended as well. Differential implementations, however, can provide improved noise suppression over a single-ended implementation.

Receiver 408 can include an amplifier 410 such as a low-noise amplifier (LNA) configured to sense transducer 406. Receiver 408 can also optionally include a gain and offset correction circuit 412. The gain and offset correction circuit can include a programmable gain amplifier (PGA) configured to apply gain to increase (or in some cases decrease) the amplitude of the signals received from LNA. The PGA can also be configured to filter (e.g., low pass) the signals received from the LNA to remove high frequency components. Additionally, the PGA circuit can also be configured to perform baselining (offset correction).

In some examples, the output of gain and offset correction circuit 412 can optionally be coupled to one or more analog processing circuits. In some examples, the output of gain and offset correction circuit 412 can be coupled to a demodulation circuit 414 configured to demodulate the received signals (e.g., by I/Q demodulation). In some examples, the output of the gain and offset correction circuit 412 can be coupled to an envelope detection circuit 415 configured to perform envelope detection on the received signals. In some examples, the output of gain and offset correction circuit 412 can be filtered at filter 416. In some examples, these blocks/circuits can be placed in a different order. In some examples, the processing of one or more of these analog processing circuits can be performed in the digital domain.

The received signals, whether raw or processed by one or more of demodulation circuit 414, envelope detection circuit 415 or filter 416, can be passed to an analog-to-digital converter (ADC) 418 for conversion to a digital signal. In some examples, an input/output (I/O) circuit 420 can be used to transmit received data for processing. In some examples, the output of I/O circuit 420 can be transferred to one or more processors 430 (e.g., corresponding to DSP 206). In some examples, some digital signal processing can be performed (e.g., by ultrasonic force detection circuit 401) before transmitting the data to the one or more processors. In some examples, the I/O circuit 420 may be used for data transfer to processor(s) 430 (and/or used for writing the control registers of and/or firmware download to ultrasonic force detection circuit 401 from processor(s) 430.

In some examples, ultrasonic force detection circuit 401 can also optionally include a correlator 450. Correlator 450 can be a digital correlator configured to correlate force data/force signal for a no-applied force case (e.g., baseline force signal) with measured force data/force signal that may include an applied force. In some examples, the correlation can indicate a change in the time of flight of one or more ultrasonic waves through the finger and/or a change in thickness of part or all of the finger, and thereby indicate an applied force by the finger.

The components of receiver circuitry 408 described above can be implemented to detect applied force (e.g., by the finger on the surface). In some examples, a low-power (relative to the receiver circuitry illustrated in FIG. 4) time gating circuit can be used to determine time-of-flight for force detection. In some examples, a zero-crossing detector can be used to detect a time shift (with respect to a baseline zero crossing time) in the reflected energy for force detection. In some examples, a time shift can be computed by cross-correlating the measured reflected energy (e.g., force signal) with a baseline (zero-force) reflected energy (e.g., baseline force signal).

A control circuit, ultrasonic scan control circuit 422, can be used to control timing and operations of the circuitry of ultrasonic force detection circuit 401. Ultrasonic scan control circuit 422 can be implemented in hardware, firmware, software or a combination thereof. In some examples, ultrasonic scan control circuit 422 can include digital logic and timing control. Digital logic can provide the various components of ultrasonic force detection circuit 401 with control signals. A timing control circuit can generate timing signals for ultrasonic force detection circuit 401, and can generally sequence the operations of ultrasonic force detection circuit 401. In some examples, ultrasonic force detection circuit 401 can receive a master clock signal from an external source (e.g., clock from processor(s) 430, crystal oscillator, ring oscillator, RC oscillator, or other high-performance oscillator). In some examples, an on-chip oscillator can be used to generate the clock. In some examples, a master clock signal can be generated by an on-chip phase locked loop (PLL), included as part of ultrasonic force detection circuit 401, using an external clock as the input. In some examples, a master clock signal can be routed to ultrasonic force detection circuit 401 from processor(s). The appropriate master clock source can be determined based on a tradeoff between area, thickness of the stack-up, power and electromagnetic interference.

It is to be understood that the configuration of FIG. 4 is not limited to the components and configuration of FIG. 4, but can include other or additional components (e.g., memory, signal processor, etc.) in multiple configurations according to various examples. Additionally, some or all of the components illustrated in FIG. 4 can be included in a single circuit, or can be divided among multiple circuits while remaining within the scope of the examples of the disclosure.

Figure 5A:
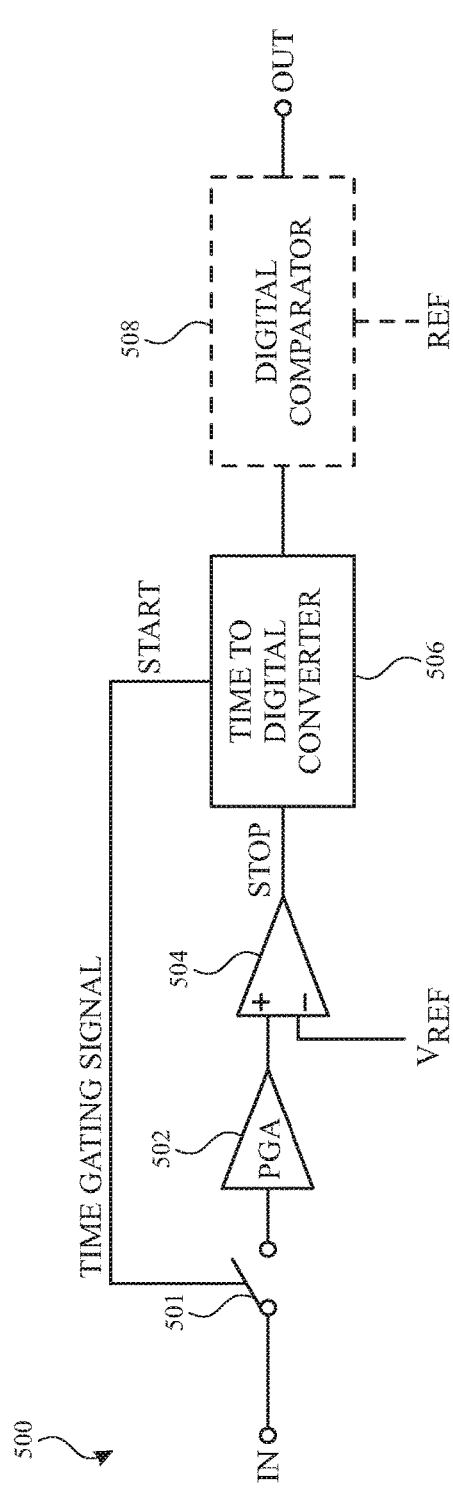
FIGS. 5A-5C illustrate example receiver circuits for force detection according to examples of the disclosure.
Figure 5B:
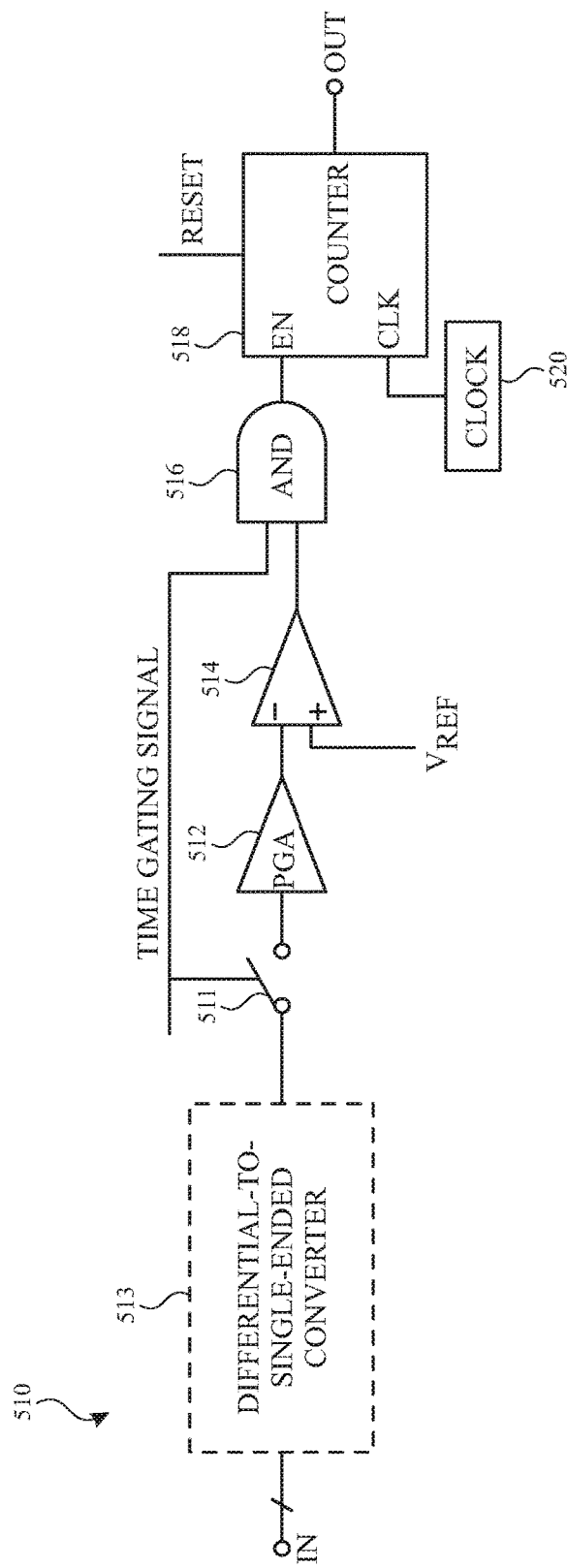
Figure 5C:
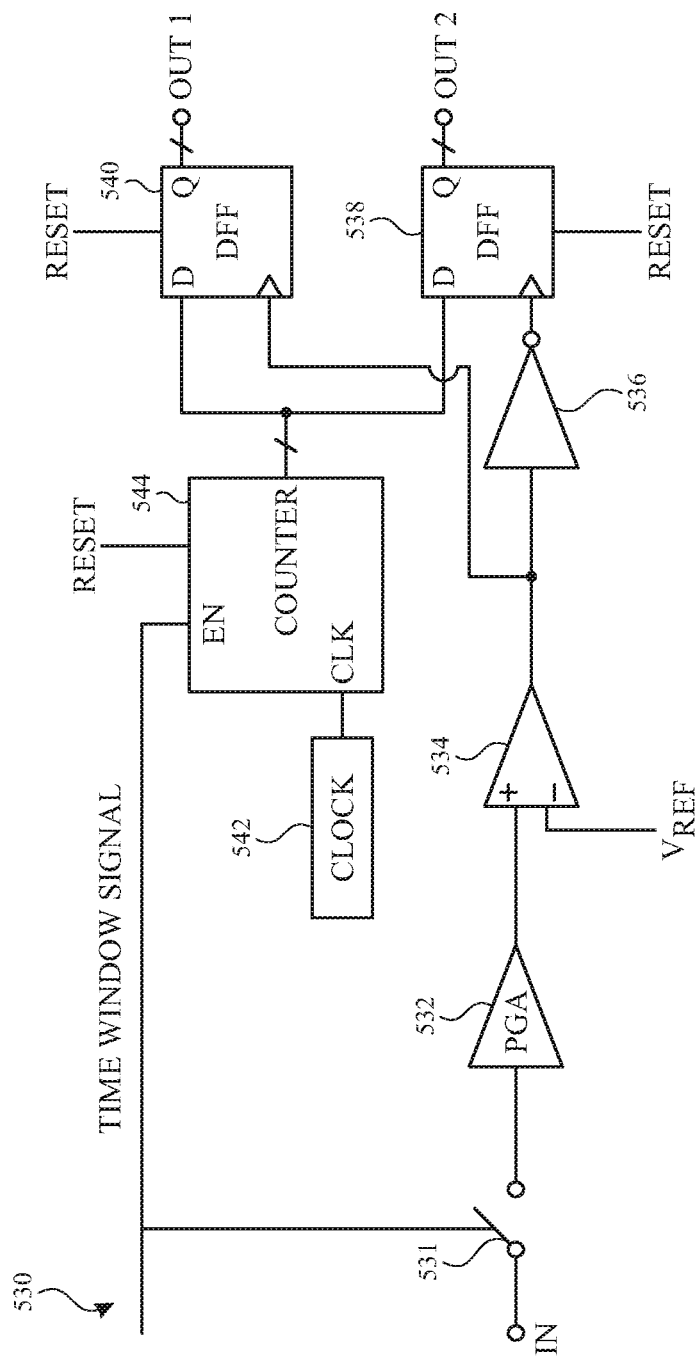

In some examples, the receive circuitry can be simplified with respect to the receive circuitry 408 illustrated in FIG. 4 to reduce power and hardware requirements. FIGS. 5A-5C illustrate example receiver circuits for force detection according to examples of the disclosure. It should be understood that the circuits of FIGS. 5A-5C are exemplary, and other circuits can be used for force detection. Additionally, although the circuits of FIGS. 5A-5C can be single-ended circuits, partially or fully differential circuits can also be used. FIG. 5A illustrates an example force detection circuit 500 according to examples of the disclosure. Force detection circuit 500 can include a gate (or switch) 501, a programmable gain amplifier (PGA) 502, an analog comparator 504, a time-to-digital signal converter 506 and, optionally, a digital comparator 508. A gate timing signal can be used to activate gate 501 (e.g., close a switch) between the input from the transducer (e.g., corresponding to transducer 406) and the PGA 502. The gate timing signal can also be used to start timing by time-to-digital signal converter 506. The output of PGA 502 can be input into comparator 504, which can be used for finding a reliable transition edge of the receive signal. When the comparator transitions, the timing by the time-to-digital signal converter 506 stops. The digital output (e.g., a digitized number) of the time-to-digital signal converter 506, which can be proportional to the applied force, can be sent from the ultrasonic force detection circuit 500 to a processor. In some examples, an optional digital comparator 508 can be used to transmit force reading exceeding a threshold amount of force. In some examples, a time window can be selected and all or some of the threshold crossing time stamps can be sent from the force detection circuit 500 to the processor(s), and the time stamps can be used to detect the time-of-flight change (and therefore the force applied). In some examples, the digitized data for a given time window can be sampled at two different times (one time without and one time with the force applied) and the correlation between the two time-of-flight measurements can be used to determine the change in time-of-flight (and therefore applied force).

FIG. 5B illustrates an exemplary force detection circuit 510 according to examples of the disclosure. Force detection circuit 510 can include a gate (or switch) 511, a PGA 512, a differential-to-single-ended converter circuit 512, an analog comparator 514, a logical AND gate 516, a digital counter 518 and a clock 520. A gate timing signal can be used to activate gate 511 (e.g., close a switch) between the input from the transducer used to measure force and the differential-to-single-ended converter circuit 512. The single-ended output of the differential-to-single-ended converter circuit 512 can be provided to PGA 512. The gate timing signal can also be output to logical AND gate 516. When the gate timing signal and the output of analog comparator 514 can both be high, counter 518 can start timing based on a clock signal from clock 520. The output of PGA 512 can be input into comparator 514, which can be used for finding a reliable transition edge of the receive signal. When the comparator transitions, the timing by the counter 518 can be stopped. The digital output (e.g., a digitized number) from counter 518, which can be proportional to the applied force, can be sent from the ultrasonic force detection circuit 510 to the processor(s).

It should be understood exemplary force detection circuits 500 and 510 can be reconfigured to output the threshold crossing on a rising edge, a falling edge or both edges of the received signal. Force detection circuits 500 and 510 as illustrated in FIGS. 5A and 5B output the rising edge threshold crossings after each rising edge of the time gating signal. In some examples, threshold crossings can be detected on both rising and falling edges of the input signal. FIG. 5C illustrates an exemplary force detection circuit 530 according to examples of the disclosure. Force detection circuit 530 can include a gate (or switch) 531, a PGA 532, an analog comparator 534, a logical inverter 536, n-bit D-Flip Flops 538 and 540, a clock 542 and a digital counter 544. A reset signal can be used to reset D-Flip Flops 538 and 540. A time window signal can be used to activate gate 531 between the input from the transducer used to measure force and PGA 532. The time window signal can also enable counter 544 to start timing based on a clock signal from clock 542. The output of PGA 532 can be input into comparator 534, which can be used for finding reliable transition edges of the receive signal. The output of comparator 534 can be used to clock D-Flip Flops 538 and 540. D-Flip Flop 538 can be clocked with an inverted version of the comparator output to detect the opposite edge. D-Flip Flops 538 and 540 can receive the output of counter 544 as data inputs, and can output the count of counter 544 for a rising and falling edge transition, respectively. The digital outputs (e.g., digitized numbers) of D-Flip Flops 538 and 540, which can be proportional to the applied force, can be sent from the force detection circuit 500 to the processor(s).

Figure 7A:
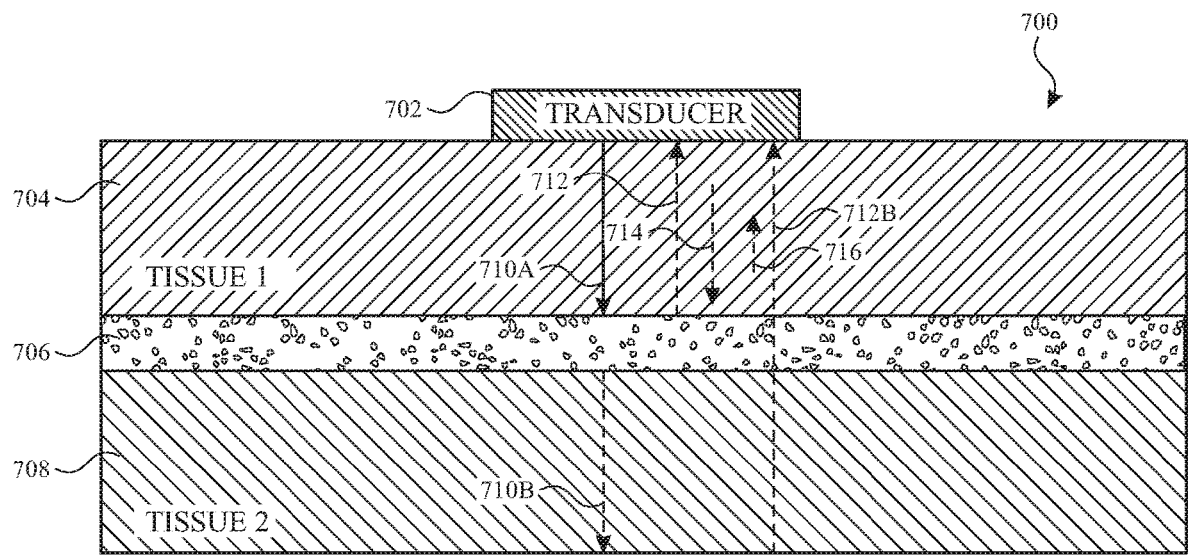
FIG. 7A illustrates an example representation of a finger and ultrasonic waves transmitted by and received from transducer according to examples of the disclosure.

FIG. 7A illustrates an example representation 700 of a finger and ultrasonic waves transmitted by and received from transducer 702 according to examples of the disclosure. The finger illustrated in representation 700 includes a first tissue layer 704 (e.g., corresponding to first tissue layer 148, 648), bone layer 706 (e.g., corresponding to distal bone 103A, 150, 650) and second tissue layer 708 (e.g., corresponding to second tissue layer 152, 652). Transducer 702 can be stimulated to generate a first ultrasonic wave that propagates through the first tissue layer 704 as shown by ultrasonic wave 710A to bone layer 706. In some examples, the transmitted ultrasonic wave continues to propagate through the second tissue layer 706 as shown by ultrasonic wave 710B. When ultrasonic wave 710A reaches bone layer 706, a portion of the ultrasonic wave is reflected back toward transducer 702, as shown by first reflected ultrasonic wave 712A. As shown in FIG. 7A, the distance traversed by ultrasonic wave 710A and the reflected ultrasonic wave 712A can measured, for example, based on a time-of-flight between the transmission of ultrasonic wave 710A and the receipt of reflected ultrasonic wave 712A. For example, the distance across first tissue layer 704 from transducer 702 to bone layer 704 can be determined as half the product of the measured time-of-flight and a propagation rate of the ultrasonic waves through first tissue layer 704.

Additional reflections in first tissue layer 704 between transducer 702 and bone layer 706 can occur due to transmitted ultrasonic wave 710A (and first reflected ultrasonic wave 712A). These additional reflections are illustrated in FIG. 7A by ultrasonic waves 714 and 716, which may represent one or more additional reflections that may occur.

In addition to reflections in first tissue layer 704 between transducer 702 and bone layer 706, in some examples, ultrasonic wave 710B can continue to propagate to the opposite side of second tissue layer 708 (e.g., to the finger pad). The discontinuity at the termination of second tissue layer 708 can result in the reflection of some of ultrasonic wave 710B as shown by second reflected ultrasonic wave 712B.

Figure 7B:
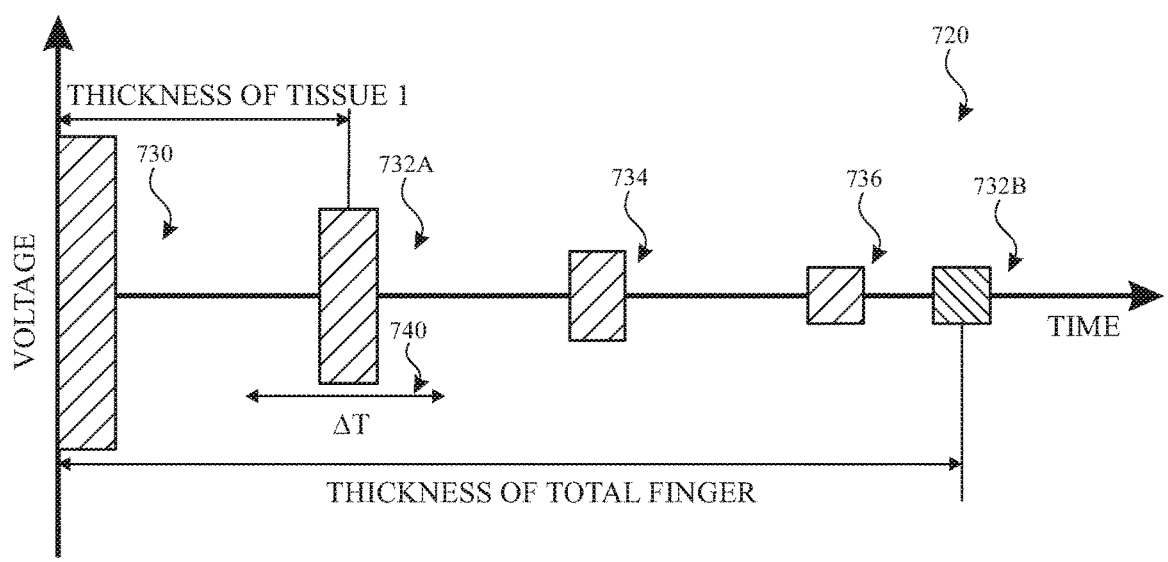
FIG. 7B illustrates an example timing diagram of the energy at transducer according to examples of the disclosure.

FIG. 7B illustrates an example timing diagram 720 of the energy at transducer 702 according to examples of the disclosure. Timing diagram 720 illustrates transmitted ultrasonic wave 730 from an initial stimulation of transducer 702 to generate ultrasonic waves in the finger (e.g., corresponding to the energy resulting in transmitted ultrasonic waves 710A-B), a first reflection 732A (corresponding to the first reflected ultrasonic wave 712A), additional ultrasonic reflections 734 and 736 (corresponding to additional ultrasonic waves 714 and 716), and second reflected ultrasonic wave 732B (e.g., corresponding to the second reflected ultrasonic wave 712B). The time-of-flight between the time of transmitting transmitted ultrasonic wave 730 and the time of receipt of the first ultrasonic reflection 732A can correspond to the thickness of first tissue layer 704 (the distance across the first tissue layer 704). Variations in the time of receipt can be proportional to variations in the thickness of the first tissue layer 704, and the variations can indicate an applied force. For example, a rightward shift of the time of receipt (a delay in time of receipt) of first reflected wave 732A can indicate an increase in force (due to expansion of the first tissue layer in response to force applied by the second tissue layer to a surface). In a similar manner, the time-of-flight between the time of transmitting transmitted ultrasonic wave 730 and the time of receipt of the second ultrasonic reflection 732B can correspond to the thickness of finger (including the first tissue layer 704, bone layer 706 and second tissue layer 708).

Figure 7C:
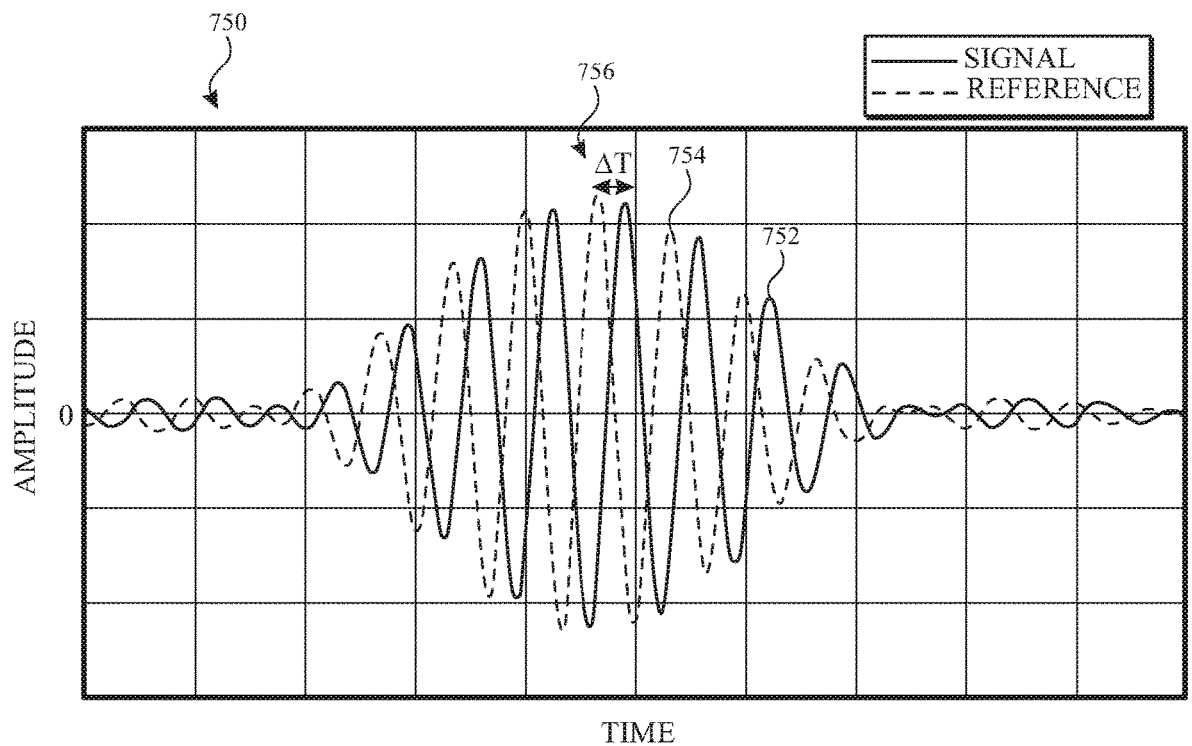
FIG. 7C illustrates an example plot including a measured signal and a baseline signal according to examples of the disclosure.

FIG. 7C illustrates an example plot 750 including a measured signal 752 and a baseline signal 754 according to examples of the disclosure. Plot 750 shows a portion of the received energy at transducer 702 corresponding to the time range including first reflected ultrasonic wave 712A/732A (e.g., without the transmitted ultrasonic wave 730 or the other reflections in timing diagram 720). As illustrated in FIG. 7C, the measured signal 752 can be delayed with respect to the baseline signal 756 by ΔT. The delay, ΔT, can be proportional to the thickness increase in first tissue layer 704 and proportional to an increase in the applied force by the finger. In some examples, when the delay exceeds a threshold delay (corresponding to a threshold applied force), the ultrasonic force detection system (e.g., DSP 206) can report a press input (a qualifying force input). In some examples, when the delay fails to exceed the threshold delay (corresponding to the threshold applied force), the ultrasonic force detection system (e.g., DSP 206) can forgo reporting a press input (as no qualifying force input exceeding the threshold is detected).

In some examples, as described herein, the applied force can be determined based on the first reflected ultrasonic wave 712A/732A. In some examples, the applied force can be determined based on the second reflected ultrasonic wave 712B/732B. For example, the time range including second reflected ultrasonic wave 712B/732B can see the second reflected ultrasonic wave arrive early with respect to the baseline signal. The (leftward) time shift, ΔT, can be inversely proportional to the thickness decrease of the finger's total thickness and inversely proportional to an increase in the applied force by the finger. In some examples, when the time shift exceeds a threshold (corresponding to a threshold applied force), the ultrasonic force detection system (e.g., DSP 206) can report a press input (a qualifying force input). In some examples, when the time shift fails to exceed the threshold (corresponding to the threshold applied force), the ultrasonic force detection system (e.g., DSP 206) can forgo reporting a press input.

Figure 8:
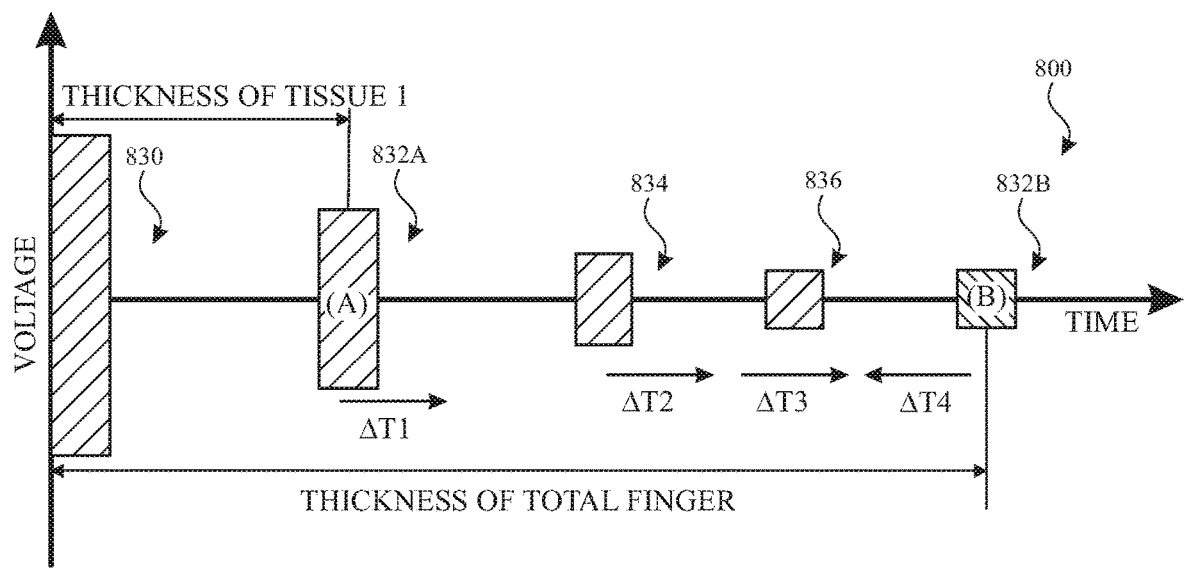
FIG. 8 illustrates an example timing diagram of the energy at the transducer according to examples of the disclosure.

In some examples, as described herein, the applied force can be determined based on both the first reflected ultrasonic wave 712A/732A and the second reflected ultrasonic wave 712B/732B. FIG. 8 illustrates an example timing diagram 800 of the energy at the transducer according to examples of the disclosure. Timing diagram 800 illustrates an initial stimulation of the transducer with transmitted ultrasonic wave 830, a first ultrasonic reflection 832A, additional ultrasonic reflections 834 and 836, and second reflected ultrasonic wave 832B (e.g., corresponding transmitted ultrasonic wave 730, first reflected ultrasonic wave 732A, ultrasonic reflections 734 and 736, and second reflected ultrasonic wave 732B, respectively). The time-of-flight to the time of receipt of the first ultrasonic reflection 832A can correspond to the thickness of first tissue layer, and the time-of-flight to the time of receipt of the second ultrasonic reflection 832B can correspond to the thickness of finger (including bone and both tissue layers). In some examples, the applied force can be determined based on both a rightward shift (a delay in time of receipt) of the first reflected ultrasonic wave and a leftward shift (early time of receipt) of the second reflected ultrasonic wave. In some examples, when the delay of the first ultrasonic reflection exceeds a threshold delay (corresponding to a threshold applied force) and when the time shift (early arrival) of the second ultrasonic reflection exceeds a threshold time shift (corresponding to a threshold applied force), the ultrasonic force detection system (e.g., DSP 206) can report a press input (a qualifying force input). In some examples, when either the delay of the first reflected ultrasonic wave fails to exceed the threshold delay or the time shift of the second reflected ultrasonic wave fails to exceed the threshold time shift, the ultrasonic force detection system (e.g., DSP 206) can forgo reporting a press input.

Therefore, according to the above, some examples are directed to a force-sensitive device. The force-sensitive device can comprise: a transducer configured to be coupled to a first surface of a digit and configured to transmit ultrasonic waves to and receive ultrasonic waves from the digit; and one or more processors coupled to the transducer. The one or more processors can be programmed to estimate an applied force by the digit while a second surface of the digit is in contact with a surface based on ultrasonic waves propagating in the digit. The second surface of the digit can be opposite the first surface of the digit. Additionally or alternatively to one or more of the examples disclosed above, in some examples, estimating the applied force can comprise: receiving a first reflected ultrasonic wave corresponding to a first transmitted ultrasonic wave traversing a first distance from the first surface of the digit to a bone of the digit and returning the first distance from the bone back to the first surface; and determining the applied force based on a first time of flight between transmitting the first transmitted ultrasonic wave and receiving the first reflected ultrasonic wave or based on the first distance. Additionally or alternatively to one or more of the examples disclosed above, in some examples, the applied force can be proportional to the first time of flight or the first distance. Additionally or alternatively to one or more of the examples disclosed above, in some examples, determining the applied force based on the first time of flight or based on the first distance can comprise determining a first time delay of the first reflected ultrasonic wave. Additionally or alternatively to one or more of the examples disclosed above, in some examples, determining the time delay of the first reflected ultrasonic wave can comprise comparing one or more zero crossing times of the first reflected ultrasonic wave with one or more zero crossing times of a baseline reflected ultrasonic wave corresponding to zero applied force. Additionally or alternatively to one or more of the examples disclosed above, in some examples, determining the time delay of the first reflected ultrasonic wave can comprise comparing correlating the first reflected ultrasonic wave with a baseline reflected ultrasonic wave corresponding to zero applied force. Additionally or alternatively to one or more of the examples disclosed above, in some examples, estimating the applied force can comprise: receiving a second reflected ultrasonic wave corresponding to a second transmitted ultrasonic wave traversing a second distance from the first surface of the digit to a second surface of the digit and returning the second distance from the bone back to the first surface; and determining the applied force based on the first time of flight and a second time of flight between transmitting the second transmitted ultrasonic wave and receiving the second reflected ultrasonic wave or based on the first distance and the second distance. Additionally or alternatively to one or more of the examples disclosed above, in some examples, the applied force can be inversely proportional to the second time of flight or the second distance. Additionally or alternatively to one or more of the examples disclosed above, in some examples, determining the applied force based on the second time of flight or based on the second distance can comprise determining a time shift of the second reflected ultrasonic wave. Additionally or alternatively to one or more of the examples disclosed above, in some examples, the one or more processors can be further programmed to: in accordance with the applied force exceeding a threshold force, determine the contact between the second surface of the digit and the surface is a press input; and in accordance with the applied force failing to exceed the threshold force, forgo determining a press input. Additionally or alternatively to one or more of the examples disclosed above, in some examples, the force-sensitive device can further comprise: one or more integrated circuits coupled to the transducer and coupled to the one or more processors, the one or more integrated circuits configured to stimulate the transducer and to sense the transducer; a battery coupled to the one or more integrated circuits and the one or more processors; wireless charging circuitry configured to charge the battery; and/or wireless communication circuitry coupled to the one or more processors and configured to transmit information about the applied force to a host device. Additionally or alternatively to one or more of the examples disclosed above, in some examples, the surface can be a touch-sensitive surface or a non-touch sensitive surface.

Some examples are directed to a method of estimating force. The method can comprise: transmitting ultrasonic waves into a digit via a transducer coupled to a first surface of the digit; receiving ultrasonic waves from the digit; and estimating an applied force by the digit while a second surface of the digit is in contact with a surface based on ultrasonic waves propagating in the digit. The second surface of the digit can be opposite the first surface of the digit. Additionally or alternatively to one or more of the examples disclosed above, in some examples, estimating the applied force can comprise: receiving a first reflected ultrasonic wave corresponding to a first transmitted ultrasonic wave traversing a first distance from the first surface of the digit to a bone of the digit and returning the first distance from the bone back to the first surface; and determining the applied force based on a first time of flight between transmitting the first transmitted ultrasonic wave and receiving the first reflected ultrasonic wave or based on the first distance. Additionally or alternatively to one or more of the examples disclosed above, in some examples, the applied force can be proportional to the first time of flight or the first distance. Additionally or alternatively to one or more of the examples disclosed above, in some examples, determining the applied force based on the first time of flight or based on the first distance can comprise determining a first time delay of the first reflected ultrasonic wave. Additionally or alternatively to one or more of the examples disclosed above, in some examples, determining the time delay of the first reflected ultrasonic wave can comprise comparing one or more zero crossing times of the first reflected ultrasonic wave with one or more zero crossing times of a baseline reflected ultrasonic wave corresponding to zero applied force. Additionally or alternatively to one or more of the examples disclosed above, in some examples, determining the time delay of the first reflected ultrasonic wave can comprise comparing correlating the first reflected ultrasonic wave with a baseline reflected ultrasonic wave corresponding to zero applied force. Additionally or alternatively to one or more of the examples disclosed above, in some examples, estimating the applied force can comprise: receiving a second reflected ultrasonic wave corresponding to a second transmitted ultrasonic wave traversing a second distance from the first surface of the digit to a second surface of the digit and returning the second distance from the bone back to the first surface; and determining the applied force based on the first time of flight and a second time of flight between transmitting the second transmitted ultrasonic wave and receiving the second reflected ultrasonic wave or based on the first distance and the second distance. Additionally or alternatively to one or more of the examples disclosed above, in some examples, the applied force can be inversely proportional to the second time of flight or the second distance. Additionally or alternatively to one or more of the examples disclosed above, in some examples, determining the applied force based on the second time of flight or based on the second distance can comprise determining a time shift of the second reflected ultrasonic wave. Additionally or alternatively to one or more of the examples disclosed above, in some examples, the method can further comprise: in accordance with the applied force exceeding a threshold force, determining the contact between the second surface of the digit and the surface is a press input; and in accordance with the applied force failing to exceed the threshold force, forgoing determining a press input. Additionally or alternatively to one or more of the examples disclosed above, in some examples. Some examples of the disclosure are directed to a non-transitory computer readable storage medium. The non-transitory computer readable storage medium can store instructions, which when executed by one or more processing circuits of a device, can cause the one or more processing circuits to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A force-sensitive device, comprising:
   a transducer configured to be coupled to a first surface of a digit and configured to transmit ultrasonic waves to and receive ultrasonic waves from the digit; and
   one or more processors coupled to the transducer and programmed to:
      estimate an applied force by the digit while a second surface of the digit is in contact with a surface based on ultrasonic waves propagating in the digit, wherein the second surface of the digit is opposite the first surface of the digit;
      wherein estimating the applied force comprises:
         receiving a first reflected ultrasonic wave corresponding to a first transmitted ultrasonic wave traversing a first distance from the first surface of the digit to a first surface of a bone of the digit and returning the first distance from the first surface of the bone back to the first surface; and
         determining the applied force based on a first time of flight between transmitting the first transmitted ultrasonic wave and receiving the first reflected ultrasonic wave or based on the first distance.

2. The force-sensitive device of claim 1, wherein the applied force is proportional to the first time of flight or the first distance.

3. The force-sensitive device of claim 1, wherein determining the applied force based on the first time of flight or based on the first distance comprises determining a first time delay of the first reflected ultrasonic wave.

4. The force-sensitive device of claim 3, wherein determining the time delay of the first reflected ultrasonic wave comprises comparing one or more zero crossing times of the first reflected ultrasonic wave with one or more zero crossing times of a baseline reflected ultrasonic wave corresponding to zero applied force.

5. The force-sensitive device of claim 3, wherein determining the time delay of the first reflected ultrasonic wave comprises comparing correlating the first reflected ultrasonic wave with a baseline reflected ultrasonic wave corresponding to zero applied force.

6. The force-sensitive device of claim 1, wherein estimating the applied force comprises:
   receiving a second reflected ultrasonic wave corresponding to a second transmitted ultrasonic wave traversing a second distance from the first surface of the digit to a second surface of the digit and returning the second distance from the first surface of the bone back to the first surface; and
   determining the applied force based on the first time of flight and a second time of flight between transmitting the second transmitted ultrasonic wave and receiving the second reflected ultrasonic wave or based on the first distance and the second distance.

7. The force-sensitive device of claim 6, wherein the applied force is inversely proportional to the second time of flight or the second distance.

8. The force-sensitive device of claim 6, wherein determining the applied force based on the second time of flight or based on the second distance comprises determining a time shift of the second reflected ultrasonic wave.

9. The force-sensitive device of claim 1, wherein the one or more processors is further programmed to:
   in accordance with the applied force exceeding a threshold force, determine the contact between the second surface of the digit and the surface is a press input; and
   in accordance with the applied force failing to exceed the threshold force, forgo determining a press input.

10. The force-sensitive device of claim 1, further comprising:
    one or more integrated circuits coupled to the transducer and coupled to the one or more processors, the one or more integrated circuits configured to stimulate the transducer and to sense the transducer;
    a battery coupled to the one or more integrated circuits and the one or more processors;
    wireless charging circuitry configured to charge the battery; and
    wireless communication circuitry coupled to the one or more processors and configured to transmit information about the applied force to a host device.

11. The force sensitive device of claim 1, wherein the surface is a touch-sensitive surface or a non-touch sensitive surface.

12. The force-sensitive device of claim 1, wherein the first distance corresponds to a first thickness of the digit between the first surface of the digit and the first surface of the bone of the digit.

13. A method of estimating force comprising:
    transmitting ultrasonic waves into a digit via a transducer coupled to a first surface of the digit;
    receiving ultrasonic waves from the digit; and
    estimating an applied force by the digit while a second surface of the digit is in contact with a surface based on ultrasonic waves propagating in the digit, wherein the second surface of the digit is opposite the first surface of the digit;
    wherein estimating the applied force comprises:
       receiving a first reflected ultrasonic wave corresponding to a first transmitted ultrasonic wave traversing a first distance from the first surface of the digit to a first surface of a bone of the digit and returning the first distance from the first surface of the bone back to the first surface; and
       determining the applied force based on a first time of flight between transmitting the first transmitted ultrasonic wave and receiving the first reflected ultrasonic wave or based on the first distance.

14. The method of claim 13, wherein determining the applied force based on the first time of flight or based on the first distance comprises determining a first time delay of the first reflected ultrasonic wave.

15. The method of claim 13, further comprising:
    in accordance with the applied force exceeding a threshold force, determining the contact between the second surface of the digit and the surface is a press input; and
    in accordance with the applied force failing to exceed the threshold force, forgoing determining a press input.

16. The force-sensitive device of claim 6, wherein the second distance corresponds to a second thickness of the digit between the first surface of the digit and the second surface of the digit opposite the first surface of the digit.

17. A non-transitory computer readable storage medium storing instructions, which when executed by one or more processing circuits of a device, cause the one or more processing circuits to perform a method of estimating force comprising:
    transmitting ultrasonic waves into a digit via a transducer coupled to a first surface of the digit;
    receiving ultrasonic waves from the digit; and
    estimating an applied force by the digit while a second surface of the digit is in contact with a surface based on ultrasonic waves propagating in the digit, wherein the second surface of the digit is opposite the first surface of the digit;
    wherein estimating the applied force comprises:
       receiving a first reflected ultrasonic wave corresponding to a first transmitted ultrasonic wave traversing a first distance from the first surface of the digit to a first surface of a bone of the digit and returning the first distance from the first surface of the bone back to the first surface; and
       determining the applied force based on a first time of flight between transmitting the first transmitted ultrasonic wave and receiving the first reflected ultrasonic wave or based on the first distance.

18. The non-transitory computer readable storage medium of claim 17, wherein determining the applied force based on the first time of flight or based on the first distance comprises determining a first time delay of the first reflected ultrasonic wave.

19. The non-transitory computer readable storage medium of claim 17, the method further comprising:
    in accordance with the applied force exceeding a threshold force, determining the contact between the second surface of the digit and the surface is a press input; and
    in accordance with the applied force failing to exceed the threshold force, forgoing determining a press input.

20. The force-sensitive device of claim 1, wherein the force-sensitive device is implemented in a wearable input device.

* * * * *

UNITED STATES PATENT AND TRADEMARK OFFICE
CERTIFICATE OF CORRECTION

PATENT NO. : 11,397,486 B2
APPLICATION NO. : 16/997899
DATED : July 26, 2022
INVENTOR(S) : Ehsan Khajeh et al.

It is certified that error appears in the above-identified patent and that said Letters Patent is hereby corrected as shown below:

In the Claims

Column 19, Line 56, Claim 11, delete "force sensitive" and insert --force-sensitive--.

Signed and Sealed this
Sixth Day of September, 2022

Katherine Kelly Vidal
*Director of the United States Patent and Trademark Office*